United States Patent
Fei et al.

(10) Patent No.: US 9,142,030 B2
(45) Date of Patent: Sep. 22, 2015

(54) SYSTEMS, METHODS AND COMPUTER READABLE STORAGE MEDIA STORING INSTRUCTIONS FOR AUTOMATICALLY SEGMENTING IMAGES OF A REGION OF INTEREST

(71) Applicant: EMORY UNIVERSITY, Atlanta, GA (US)

(72) Inventors: Baowei Fei, Atlanta, GA (US); Xulei Qin, Atlanta, GA (US)

(73) Assignee: EMORY UNIVERSITY, Atlanta, GA (US)

( * ) Notice: Subject to any disclaimer, the term of this patent is extended or adjusted under 35 U.S.C. 154(b) by 40 days.

(21) Appl. No.: 14/208,659

(22) Filed: Mar. 13, 2014

(65) Prior Publication Data

US 2014/0270447 A1    Sep. 18, 2014

Related U.S. Application Data

(60) Provisional application No. 61/778,725, filed on Mar. 13, 2013.

(51) Int. Cl.
*G06K 9/00* (2006.01)
*G06T 7/00* (2006.01)

(52) U.S. Cl.
CPC ............. *G06T 7/0089* (2013.01); *G06T 7/0083* (2013.01); *G06T 2207/10132* (2013.01); *G06T 2207/20076* (2013.01); *G06T 2207/20081* (2013.01); *G06T 2207/20161* (2013.01); *G06T 2207/30048* (2013.01)

(58) Field of Classification Search
None
See application file for complete search history.

(56) References Cited

U.S. PATENT DOCUMENTS

| | | | |
|---|---|---|---|
| 6,292,575 B1* | 9/2001 | Bortolussi et al. | 382/118 |
| 6,526,156 B1* | 2/2003 | Black et al. | 382/103 |
| 2003/0149356 A1* | 8/2003 | Wei et al. | 600/425 |
| 2004/0034611 A1* | 2/2004 | Kee et al. | 706/20 |
| 2008/0009733 A1 | 1/2008 | Saksena | |
| 2009/0156933 A1 | 6/2009 | Gerard et al. | |
| 2009/0232353 A1* | 9/2009 | Sundaresan et al. | 382/103 |
| 2011/0301447 A1* | 12/2011 | Park et al. | 600/407 |

OTHER PUBLICATIONS

Macenko "Eigenimage-Based Robust Image Segmentation Using Level Sets", thesis presented to faculty of Russ College of Engineering and Technology of Ohio University, 2006.*
Cao et al. (Mar. 2011). "The Sparse Matrix Transform for Covariance Estimation and Analysis of High Dimensional Signals." IEEE Transactions on Image Processing, 20(3):625-640.
Bachega et al. (2010). "Fast Signal Analysis and Decomposition on Graphs Using the Sparse Matrix Transform." 2010 IEEE International Conference on Acoustics, Speech, and Signal Processing, 5426-5429.

(Continued)

*Primary Examiner* — Shervin Nakhjavan
(74) *Attorney, Agent, or Firm* — Emory Patent Group (57) ABSTRACT

Systems, methods, and computer-readable storage media relate to segmenting an image series of at least one image of a region of interest of a subject. The methods, systems, and computer readable storage media can automatically segment interior and exterior boundaries relative to the region of interest (e.g., epicardial and endocardial boundaries with respect to a right ventricle) from an image series by combining sparse matrix transform, a training model, and a localized region based level set function.

20 Claims, 6 Drawing Sheets

(56) References Cited

OTHER PUBLICATIONS

Mertens et al. (2010). "Imaging the right ventricle—current state of the art." Nature Reviews Cardiology, 7:551-563.
Mitoff et al. (Mar. 2012). "Imaging the failing right ventricle." Current Opinion in Cardiolology, 27(2):148-53.
Qin et al. (2013). "Automatic segmentation of right ventricular ultrasound images using sparse matrix transform and a level set." Physics in Medicine and Biology, 58: 7609-7624, Published Oct. 10, 2013.
Sanz et al. (2012). "Imaging of the Right Ventricle." Cardiology Clinics, 30(2): 189-203.
Asbjorn Breivik Engas. (2008). Thesis. "Segmentation of Right Ventricle in 3D Ultrasound Recordings." (retreived from ntnu.diva-portal.org).

* cited by examiner

SYSTEMS, METHODS AND COMPUTER READABLE STORAGE MEDIA STORING INSTRUCTIONS FOR AUTOMATICALLY SEGMENTING IMAGES OF A REGION OF INTEREST

CROSS REFERENCE TO RELATED APPLICATION

This application claims priority to Provisional Application Ser. No. 61/778,725 filed Mar. 13, 2013, which is hereby incorporated by reference in its entirety.

BACKGROUND

Reliable evaluation of the structure and function of aspects of organs from images is of importance in clinical examination and diagnosis of most disorders, for example, cardiac disorders. However, automatic segmentation of some organs that have irregular geometry, such as the right ventricle (RV) of a heart, can be difficult. For example, the right ventricle has a highly variable, crescent shape, and thin and ill-defined borders. Thus, methods that have been applied to segment left ventricle (LV) images cannot be directly applied to segment right ventricle (RV) on echocardiography because of: (i) poor imaging quality for RV and (ii) irregular geometry of the RV.

Despite the importance of its structure evaluations for clinical diagnosis, images of these organs, such as of the RV, are often segmented manually by experts. This can be time consuming because hundreds of images in one image series need to be segmented and also because the irregular shape can make the segmentation difficult.

SUMMARY

Thus, there is a need for automatic segmentation methods.

This disclosure generally relates to methods, systems, and computer readable storage media that include instructions for segmenting an image series of at least one image of a region of interest of a subject. The methods, systems, and computer readable storage media automatically segment interior and exterior boundaries relative to the region of interest (e.g., epicardial and endocardial boundaries with respect to a right ventricle) from an image series by combining sparse matrix transform, a training model, and a localized region based level set function.

In some embodiments, the method may include generating a plurality of eigenimages for the image series, the generating including extracting at least one motion region of the region of interest as the plurality of eigenimages; registering at least one reference eigenimage to a training model of the region of interest, the at least one reference eigenimage being based on at least one eigenimage of the plurality of eigenimages and the training model including at least one segmented image of the region of interest; segmenting each image, the segmenting including applying a localized region based level set function; and outputting each segmented image.

In some embodiments, the disclosure may relate to a computer-readable storage medium storing instructions for segmenting an image series of at least one image of a region of interest of a subject. In some embodiments, the instructions may include generating a plurality of eigenimages for the image series, the generating including extracting at least one motion region of the region of interest as the plurality of eigenimages; registering at least one reference eigenimage to a training model of the region of interest, the at least one reference eigenimage being based on at least one eigenimage of the plurality of the eigenimages and the training model including at least one segmented image of the region of interest; segmenting each image, the segmenting including applying a localized region based level set function; and outputting each segmented image. In some embodiments, the computer-readable storage medium may be a non-transitory computer-readable medium.

In some embodiments, the series may include a plurality of images of the region of interest. The method and computer readable media may include generating the at least one reference eigenimage for each image. The generating the at least one reference eigenimage may include selecting at least a portion of the plurality of eigenimages based on eigenvalue. In some embodiments, the generating the eigenimage may include using sparse matrix transform to extract the at least one motion region.

In some embodiments, the segmenting may include determining at least one initialization region, the determining including estimating at least one initialization region for the training model. In some embodiments, the at least one initialization region may include an interior region and an exterior region relative to the region of interest. In some embodiments, the at least one initialization region may include an epicardial region and an endocardiac region.

In some embodiments, the segmenting may include adjusting the at least one initialization region until the segmented image has a minimum energy. The adjusting the at least one initialization region may include varying the training model. The segmenting may include segmenting an epicardial boundary and an endocardial boundary of a right ventricle of a subject for each image.

In some embodiments, the disclosure may relate to a system for segmenting an image series of at least one image of a region of interest of a subject. The system may include an eigenimage generation module configured to generate a plurality of eigenimages for the image series, the eigenimage generation module being configured to extract at least one motion region of the region of interest as the plurality of eigenimages; an image registration module configured to register at least one reference eigenimage to a training model of the region of interest, the at least one reference eigenimage being based on at least one eigenimage of the plurality of eigenimages and the training model including at least one segmented image of the region of interest; and an image segmentation module configured to segment each image by applying a localized region based level set function.

Additional advantages of the disclosure will be series forth in part in the description which follows, and in part will be obvious from the description, or may be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The disclosure can be better understood with the reference to the following drawings and description. The components in the figures are not necessarily to scale, emphasis being placed upon illustrating the principles of the disclosure.

DETAILED DESCRIPTION OF THE EMBODIMENTS

The following description, numerous specific details are series forth such as examples of specific components, devices, methods, etc., in order to provide an understanding of embodiments of the disclosure. It will be apparent, however, to one skilled in the art that these specific details need not be employed to practice embodiments of the disclosure. In other instances, well-known materials or methods have not been described in detail in order to avoid unnecessarily obscuring embodiments of the disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

This disclosure generally relates to methods, systems, and computer readable storage media that automatically segments images of a region of interest of a subject, for example, ultrasound images of a right ventricle. The disclosed systems, devices and methods are described with respect to ultrasound images of a right ventricle of a heart. However, it will be understood that the disclosure is not limited to segmenting ultrasound images of the right ventricle. The systems, devices and methods can process images of other regions of interest, for example, organs and portions of organs, including, but not limited to, prostate, pancreas, kidney, liver, or brain. Also, the systems, devices and methods can also process images from other medical imaging modalities including, but not limited to, MRI or CT.

Methods & Generated Images

The methods of the disclosure are not limited to the steps described herein. The steps may be individually modified or omitted, as well as additional steps may be added.

Unless stated otherwise as apparent from the following discussion, it will be appreciated that terms such as "identifying," "receiving," "integrating," "filtering," "combining," "reconstructing," "segmenting," "generating," "registering," "determining," "obtaining," "processing," "computing," "selecting," "estimating," "detecting," "tracking," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods may be compiled for execution on a variety of hardware platforms and for interface to a variety of operating systems. In addition, embodiments are not described with reference to any particular programming language. It will be appreciated that a variety of programming languages may be used to implement embodiments of the disclosure.

Figure 1:
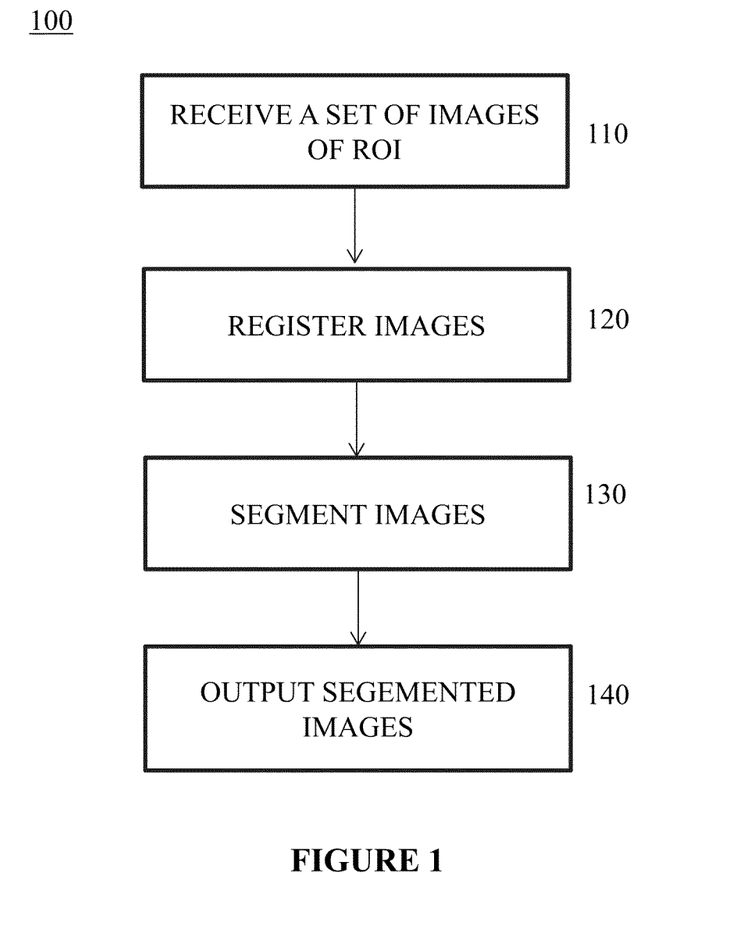
FIG. 1 illustrates a method of generating segmented images, according to embodiments.

FIG. 1 illustrates a method 100 according to embodiments to generate a segmented image of a region of interest (ROI) of a subject.

In some embodiments, the method 100 may include a step 110 of receiving images of a ROI (e.g., a heart) of a subject. The images may include image data corresponding to at least one series of at least one image of a ROI of a subject. The ROI may correspond to organs and portions of organs, including, but not limited to, heart (e.g., right ventricle and/or left ventricle), prostate, pancreas, kidney, liver, brain, etc. The series may include any number of images. The images may be received from an image acquisition device (also referred to as a medical imaging modality) or from a data storage device. The image acquisition device may include but is not limited to ultrasound (e.g., echocardiographic devices), MRI, CT, or combination devices.

In some embodiments, the image data may be in a Digital Imaging and Communications in Medicine (DICOM) format. The image data may include header and image data. The header may include image information. The image information may include information regarding the scan. The image information may include but is not limited to pixel counts, number of frames, dimensions of the image, data resolution, and image size. The image data may be raw data or processed image data.

Figure 2A:
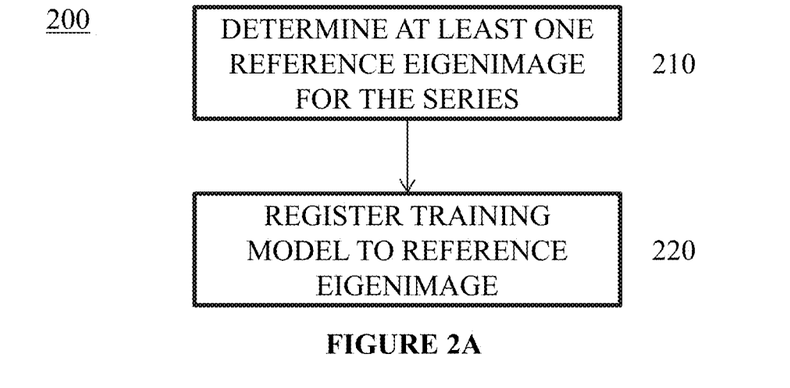
FIG. 2A illustrates a method of registering the images, according to embodiments.
Figure 2B:
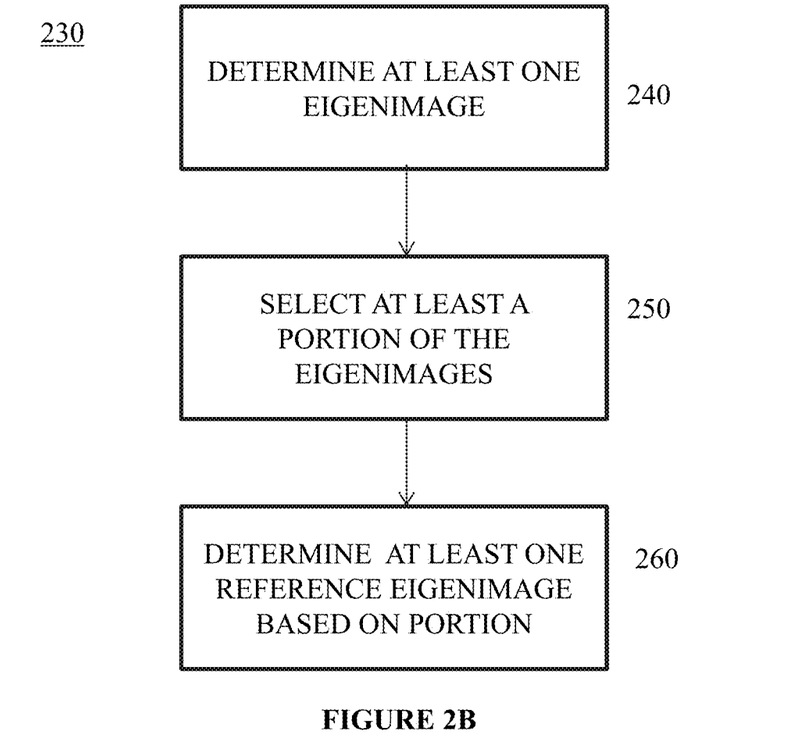
FIG. 2B illustrates a method for determining reference eigenimage for a series of images according to embodiments.

In some embodiments, the method 100 may include a step 120 of registering the images. In some embodiments, the registering step 120 may include one, some or all of the steps of methods 200 and 230. In other embodiments, the registering step 120 may be based on any registration techniques.

As shown in in FIG. 2A, the registering step 200 may include a step of 210 of determining at least one reference eigenimage for the series of images of the region of interest. In some embodiments, determining the at least one reference eigenimage may be determined by method 230 shown in FIG. 2B. In other embodiments, the determining step may be determined by other methods.

As shown in FIG. 2B, the method 230 may include a step 240 of determining at least one eigenimage for the image series. In some embodiments, a plurality of eigenimages may be determined for the image series. The eigenimage(s) may be determined by using a sparse matrix transform (SMT) based method. The SMT may extract main motion regions of the region of interest, for example, myocardium, as eigenimages by analyzing statistical information of these images. Furthermore, SMT needs less sample data and thus can make it possible to analyze the echocardiographic series, which contains much less sample data than the image dimension.

SMT has been successfully applied in the face recognition area. See, G. Z. Cao, L. R. Bachega, and C. A. Bouman, "The Sparse Matrix Transform for Covariance Estimation and Analysis of High Dimensional Signals," IEEE Transactions on Image Processing, 20(3), 625-640 (2011). Comparing with other methods such as Principal Component Analysis (PCA), SMT has several useful advantages. It can improve the accuracy of the eigen-decomposition, particularly when the number of observations is less than the vector dimension; and it is computationally fast to apply the resulting SMT eigen-decomposition. Moreover, a graph based SMT can be able to estimate the eigenimages due to the graphical constraint. See L. R. Bachega, G. Z. Cao, and C. A. Bouman, "Fast Signal Analysis and Decomposition on Graphs Using the Sparse Matrix Transform," 2010 IEEE International Conference on Acoustics, Speech, and Signal Processing, 5426-5429 (2010).

In some embodiments, the image series may be decomposed to determine the at least one eigenimage by using a SMT based technique similar to the technique disclosed in G. Z. Cao, L. R. Bachega, and C. A. Bouman, "The Sparse Matrix Transform for Covariance Estimation and Analysis of High Dimensional Signals," IEEE Transactions on Image Processing, 20(3), 625-640 (2011), which is hereby incorporated by reference.

The eigenvalue (R) may be determined by the following equation $$R = E\Lambda E^t \qquad (1),$$

where E is the orthonormal matrix of eigenvectors and $\Lambda$ is the diagonal matrix of eigenvalues.

In other embodiments, the eigenvalues may be determined using a different technique.

After the at least one eigenimage is determined for the series, the method 230 may include step 250 of selecting at least a portion of the eigenimages, the portion corresponding to at least one eigenimage. In some embodiments, the portion may correspond to a predetermined number of eigenimages. For example, if a series includes about 100 images, the predetermined number may correspond to about 1-15 eigenimages. The predetermined number may be more eigenimages. In some embodiments, the selected eigenimage(s) may correspond to a range of one or more eigenvalues. For example, the selected eigenimages (s) may correspond to the highest eigenvalue(s) relative to the other eigenvalues of the series. In other embodiments, the selected images may be determined according to other methods, for example, randomly.

In some embodiments, the method 230 may include a step 260 of determining the least one reference eigenimage based on the selected portion and/or number of eigenimages. Any number of reference eigenimages may be determined. In some embodiments, one reference eigenimage may be determined for the series. In other embodiments, more than one reference eigenimage may be determined for the series.

In some embodiments, the at least one reference eigenimage may correspond to the eigenimage(s) of the selected portion. For example, the selected portion may correspond to a number of eigenimages with the highest eigenvalue(s) relative to the other eigenvalues of the series and thus the at least one reference eigenimage may correspond to the highest eigenvalue(s) relative to the other eigenvalues. In some embodiments, the reference eigenimage may be determined by averaging the eigenimages of the portion. In other embodiments, the reference eigenimage may be determined according to other analytical methods (e.g., mean, median, etc.).

After the at least one reference eigenimage is determined for the series, the at least one reference eigenimage(s) may be registered to a training model of the ROI (step 220 in FIG. 2A). By registering the training model to the extracted eigenimages, the main location of the region of interest and the corresponding transform relationship between the training model and the SMT-extracted results in the series may be detected The registration may be performed using any registration technique, for example, rigid-body transformation. The training model may be specific to the ROI, medical imaging modality, or a combination thereof. The training model may be stored in a memory.

In some embodiments, the training model may be at least one segmented image of the region of interest. The training model may be a registered image of the ROI that is generated from a plurality of different image series of the ROI. In some embodiments, at least one, some, or all image(s) of the image series may be manually segmented, automatically segmented (e.g., according to the method disclosed), or a combination thereof. In some embodiments, the training model may be an average of manually segmented image series of a ROI, automatically segmented series of a ROI, or combination thereof. In other embodiments, the training model may be generated by other techniques.

Figure 5:
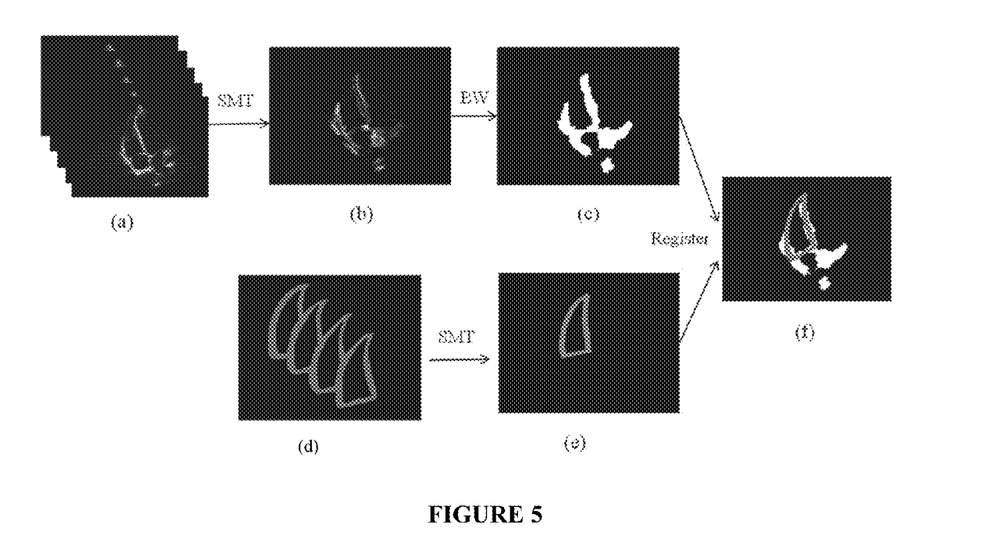
FIGS. 5(a)-(e) show an exemplary illustration of a registration of one ultrasound series of a right ventricle of a subject using sparse matrix transform (SMT) eigenimages of one ultrasound series.

FIGS. (5)d and (e) show examples of training data by manual segmentation and generated training model of a right ventricle, respectively. In this example, 450 images from nine different echocardiographic series were used to generate the training model. Both epicardial and endocardial boundaries of RV were manually defined by a cardiologist.

Results using this method can be more robust than just directly adapting training models to each image because the SMT synthesizes the whole series information and reduces the effects of poor-quality imaging, such as image regions with missing crucial structures or bright noise. Similar to the situation that a cardiologist uses the dynamic images of echocardiography rather than only one static image frame to detect the shape and location of RV in the clinic, the approach based on SMT and training model can simulate this human recognition process for automatic segmentation.

FIGS. 5(a)-(e) show an exemplary illustration of a registration of one ultrasound series of a right ventricle of a subject using sparse matrix transform (SMT) eigenimages of one ultrasound series. FIG. 5(a) shows a series of an ultrasound image series of a right ventricle of a subject. FIG. 5(b) shows a reference eigenimage determined from combination of first 20 eigenimages extracted by SMT. FIG. 5(c) shows corresponding black-white (BW) image of FIG. 5(b), where the white region indicates the most probable motion region of the myocardium. FIG. 5(d) shows Training data by manual segmentation. FIG. 5(e) shows a mean shape of the training model. FIG. 5(f) shows the registration result of the training model and the SMT eigenimages.

SMT can extract the myocardium regions with the most motion as eigenimages and can neglect other stable structures of non-myocardial regions, such as apex part, as shown in FIGS. 5(b) and (c). Because the RV shape is different from other structures, such as atriums and left ventricle, it can be easily extracted from the SMT eigenimages by registering it with the mean shape of a training model (FIG. 5(e)).

Figure 3:
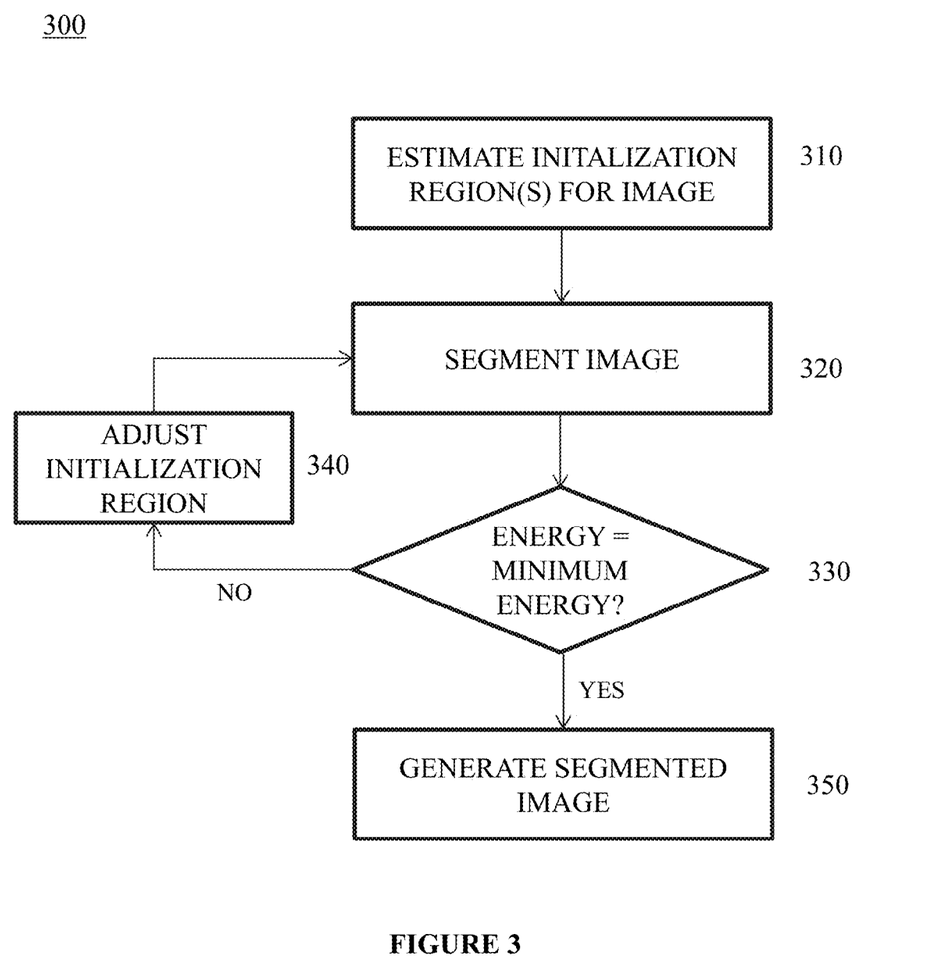
FIG. 3 illustrates a method according to embodiments for generating segmented images according to embodiments.

After the reference eigenimage(s) is registered to the training model, each image of the series may be segmented (step 130). In some embodiments, the image series may be segmented using a level set function or algorithm, for example, a localized region based level set. FIG. 3 shows an example of a method of segmenting an image of a series using a level set function. In other embodiments, the image series may be segmented using other techniques.

FIG. 3 shows a method 300 of segmenting an image of the series using a level set function. The steps of method 300 may be performed for each image of the series. The method may be performed sequentially or in parallel to generate a segmented image for each image of the series.

As shown in FIG. 3, the method 300 may include a step 310 of estimating at least one initialization region for an image of the series. The at least one initialization region may be predetermined. The initialization region may be determined from the training model of the ROI. The initialization region may correspond to an estimate of at least one region of the image (e.g., shape) to be segmented. In some embodiments, the initialization region may include one interior region and one exterior region relative to the region of interest. For example, with respect to segmenting images of the heart of a subject, the internal region may be an estimate of an epicardial region and the external region may be an estimate of an endocardiac region.

The initialization region(s) may be the same for each image of the series. In other embodiments, the initialization region(s) may be different. The initialization region may be used as a mask for the segmentation.

In some embodiments, the initialization region may be determined by adapting the weight parameters in their searching space, which is the initialization for the following level set segmentation using the following equation $$S = \bar{s} + \sum_{i=1}^{k} b_i \times U_i, \quad (2)$$

Where $\bar{s}$ is the mean shape of the training model, are the eigen-vectors, $b_i$ is the weight parameters related to eigenvalues.

After the initialization region is determined, the image may be segmented (step 320). The image may be segmented using a level set function. The level set function may contain three aspects: image data, shape prior, and thickness constraint. The mean separation energy may also be applied to calculate the image data energy. The initialization mask may not only used as initialization but also as the shape prior. The energy calculation may be determined according to the following:

$$E = E_{image}(\phi, I, H_T) + \lambda E_{shape}(\phi, S, I, H_T), \quad (3)$$

Here, I is the image data, S is the model shape data, and $\lambda$ is a weighted parameter. During the curve evolution to minimize the energy function E, $E_{image}$ tends to make E as small as possible when evolution nearer to the region edges. On the contrary, $E_{shape}$ makes E as big as possible during the evolution farther from its original position. The thickness constraint $H_T$ can be defined as a Heaviside function:

$$H_T(\varphi(\bar{x} + \bar{N} \cdot R_T)) = \begin{cases} 1, & \varphi > 0 \\ 0, & \text{otherwise} \end{cases}, \quad (4)$$

Where $R_T$ is the distance between epicardial and endocardial boundaries at the zero level set point and $\bar{N}$ is the inward normal of a point $\bar{x}$. The thickness constraint keeps the minimal thickness between both boundaries more than an average value, such as 10 pixels here.

After each image is segmented, the method may include a step 340 of determining whether the energy reaches minimum. If the energy does not reach minimum, the adapted initialization region may be adjusted or varied (step 340). The registered image (the image registered to the training model) may thereby be adjusted. The segmentation may be then repeated using the adjusted initialization region in step (330).

The correct initialization and shape prior constraints are important for the level set segmentation because the contours can leak out from weak boundaries, especially for ROIs (e.g., RV regions) that can have missing boundaries. The criteria to choose the best parameters of the training model can be determined based on the following mean separation energy function:

$$E_{ms} = -\frac{1}{2}(u - v)^2, \quad (5)$$

where u and v are the mean intensities in and outside of the ROI, respectively. After the adapted step 340, each image has an initialization mask for the level set segmentation.

The segmentation and adjustment steps may be repeated until it is determined that the energy reaches minimum. Once it is determined that the energy reaches minimum, the segmented image may be generated (step 350).

Figure 4:
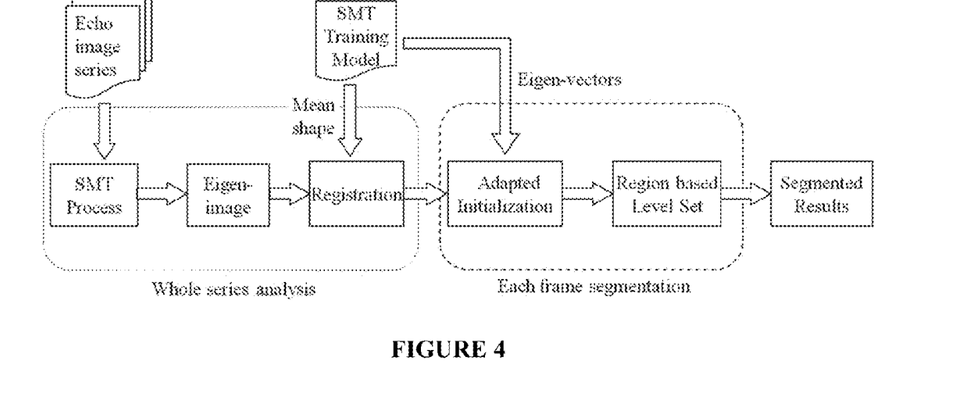
FIG. 4 show an exemplary overview of a method of generating segmented images according to embodiments.

FIG. 4 shows an exemplary overview of the method to segment images according to embodiments. As shown in FIG. 4, the sparse matrix transform may first extract main motion regions, for example, of myocardium as eigenimages, by analyzing statistical information of these images. A training model of a region of interest (e.g., right ventricle) may then be registered to the extracted eigenimages in order to automatically detect the main location of the right ventricle and the corresponding transform relationship between the training model and the SMT-extracted results in the series. The training model may then be adjusted as an adapted initialization for the segmentation of each image in the series. Based on the adapted initializations, a localized region based level set function may then be applied to segment both epicardial and endocardial boundaries of the right ventricle from the whole series.

Figure 6:
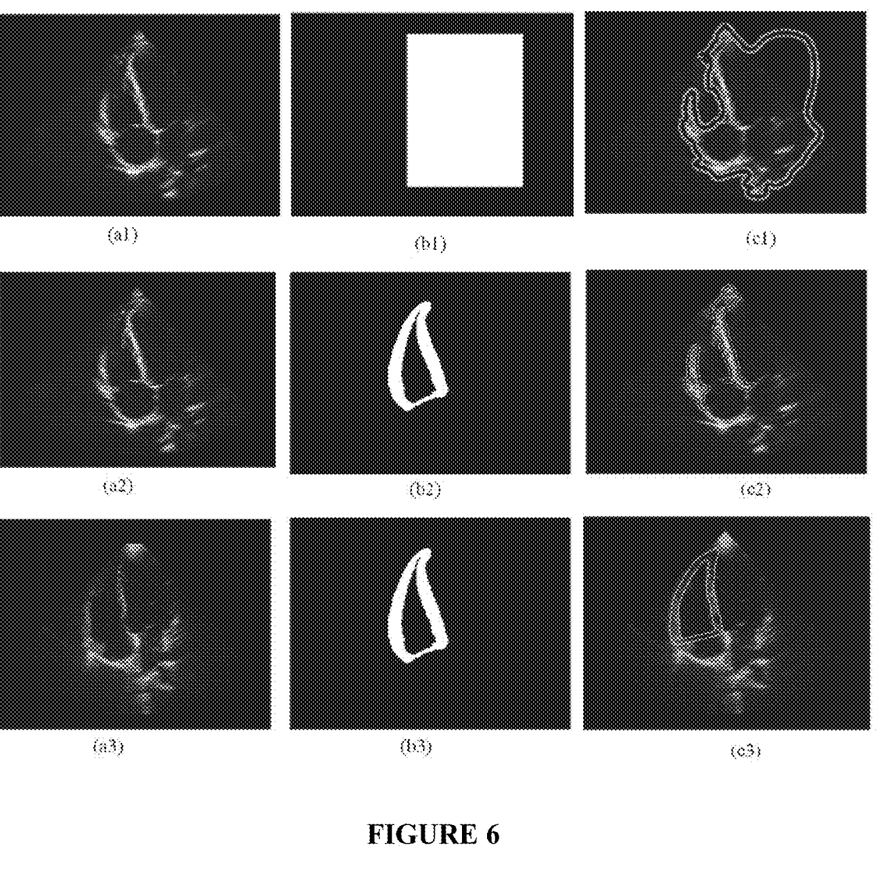
FIG. 6 shows examples of images of a right ventricle of a subject segmented by three different methods: (i) a general localized level set segmentation without adapted initialization, (ii) a localized level set segmentation with an adapted initialization rather than any shape constraint, and (iii) method according to embodiments, with the adapted initialization and shape constraint.

FIG. 6 show examples of the segmentation results. FIG. 6 illustrates a comparison of results of an image series of a right ventricle of a subject segmented by three different frameworks where the double lines are the detected boundaries of myocardium. The three different frameworks include: (i) a general localized level set segmentation without adapted initialization, (ii) a localized level set segmentation with an adapted initialization rather than any shape constraint, and (iii) segmentation, according to the disclosed methods, with the adapted initialization and also the shape constraint. Image (e1) is the result of image (a1) segmented by the localized region based level set with the general initialization mask (b1) only. Image (c2) is the result of image (a2) segmented by the localized region based level set with an adapted initialization mask (b2) but without any restriction. Image (c3) is the result of image (a3) segmented according to embodiments (by the localized region based level set with an adapted initialization mask (b3) and also restricted by the mask), where the red solid lines are its corresponding gold standard (ground truth).

In some embodiments, the method may further include a step 140 of outputting each or all of the segmented images of the series. In some embodiments, the outputting may include displaying, printing, storing, and/or transmitting the segmented images. In some embodiments, the segmented image may be transmitted to another system, server and/or storage device for the printing, displaying and/or storing the generated image.

In some embodiments, the method may include adding the segmented images to the training model of the ROI, updating the training model to incorporate the additional image series of the ROI, among others, or a combination thereof.

In some embodiments, the method may further include determining quantitative information related to a region or location of the segmented image and displaying quantitative information related to a region or location of the segmented image. The determining quantitative information may include quantifying at least one feature of the ROI. The quantitative information may relate to features of the ROI. For example, with respect to the heart, the quantitative information may include but is not limited to quantitative information related to cardiac function (e.g., myocardial deformation (strain and strain rate)). The region may be selected by the operator or may be displayed based on a position of an interventional device. The interventional device may be any device used for cardiac intervention procedures.

In some embodiments, the method may further include transmitting the generated image to another system. In some embodiments, the method may further include transmitting the generated image to an interventional system.

For example, with respect to images of a heart of a subject, the interventional system may be any system configured for cardiac interventional procedures. The method may further include displaying a position of an interventional device within the heart on the generated image. The method may further include displaying specific parameters of a selected region of the heart. The interventional device may include but is not limited to a probe, a catheter, and an ablation device. In some embodiments, the generated image may be used for planning a cardiac interventional procedure.

In some embodiments, the steps of the methods may be performed over a wired, wireless, or combination thereof. In some embodiments, the networks may be encrypted. In some embodiments, the wired network may be, but is not limited to, a local area network, such as Ethernet, or wide area network. In some embodiments, the wireless network may be, but is not limited to, any one of a wireless wide area network, a wireless local area network, a Bluetooth network, a radio frequency network, or another similarly functioning wireless network.

System Implementation

Figure 7:
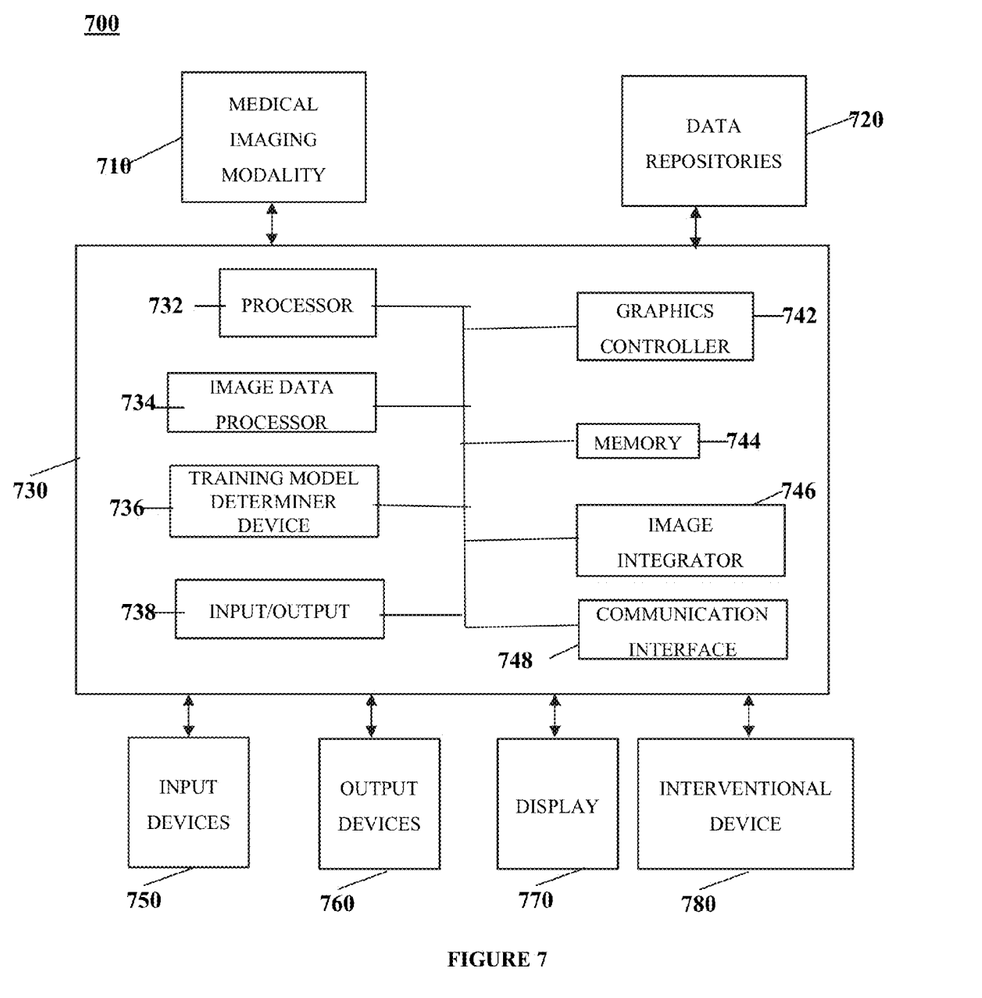
FIG. 7 shows an example of a system according to embodiments.

FIG. 7 shows an example of a system that may be used to generate an integrated image according to embodiments. The system 700 may include any number of modules that communicate with other through electrical or data connections (not shown). In some embodiments, the modules may be connected via a wired network, wireless network, or combination thereof. In some embodiments, the networks may be encrypted. In some embodiments, the wired network may be, but is not limited to, a local area network, such as Ethernet, or wide area network. In some embodiments, the wireless network may be, but is not limited to, any one of a wireless wide area network, a wireless local area network, a Bluetooth network, a radio frequency network, or another similarly functioning wireless network.

Although the modules of the system are shown as being directly connected, the modules may be indirectly connected to one or more of the other modules of the system. In some embodiments, a module may be only directly connected to one or more of the other modules of the system.

It is also to be understood that the system may omit any of the modules illustrated and/or may include additional modules not shown. It is also be understood that more than one module may be part of the system although one of each module is illustrated in the system. It is further to be understood that each of the plurality of modules may be different or may be the same. It is also to be understood that the modules may omit any of the components illustrated and/or may include additional component(s) not shown.

In some embodiments, the modules provided within the system may be time synchronized. In further embodiments, the system may be time synchronized with other systems, such as those systems that may be on the medical facility network.

As shown in FIG. 7, the system 700 may optionally include at least one subject imaging system 710. The subject imaging system 710 may be any medical imaging modality, including, but not limited to, ultrasound, MRI, CT, as well as combination devices. In other embodiments, the system 700 may communicate with the imaging systems and/or a data storage device. For example, the system may include one or more data repositories 720, such as radiological image storage (e.g., Picture Archiving and Communication System (PACS)).

In some embodiments, the medical imaging system 710 may include a computer system to carry out the image processing. The computer system may further be used to control the operation of the system or a separate system may be included.

The system 700 may further include a computing system 730 capable of generating a segmented image. In some embodiments, the computing system 730 may be a separate device. In other embodiments, the computing system 730 may be a part (e.g., stored on the memory) of other modules, for example, the interventional device 780 or one or both imaging devices 720, and controlled by its respective CPUs.

The system 730 may be a computing system, such as a workstation, computer, or the like. The system 730 may include one or more processors 732. The processor 732 may be one or more of any central processing units, including but not limited to a processor, or a microprocessor. The processor 732 may be coupled directly or indirectly to one or more computer-readable storage medium (e.g., physical memory) 744. The memory elements, such random access memory (RAM), read only memory (ROM), disk drive, tape drive, etc., or a combinations thereof. The memory may also include a frame buffer for storing image data arrays. The memory 732 may be encoded or embed with computer-readable instructions, which, when executed by one or more processors 732 cause the system 730 to carry out various functions.

In some embodiments, the disclosed methods (e.g., FIGS. 1-4) may be implemented using software applications that are stored in a memory (e.g., a non-transitory or physical computer readable storage medium) and executed by a processor (e.g., CPU) provided on the system. In some embodiments, the disclosed methods may be implanted using software applications that are stored in memories and executed by CPUs distributed across the system. As such, the modules of the system may be a general purpose computer system that becomes a specific purpose computer system when executing the routine of the disclosure. The modules of the system may also include an operating system and micro instruction code. The various processes and functions described herein may either be part of the micro instruction code or part of the application program or routine (or combination thereof) that is executed via the operating system. In addition, various other peripheral devices may be connected to the computer platform such as an additional data storage device, a printing device, and other I/O (input/output) devices.

In some embodiments, the system 700 may include an image data processor 734 configured to process raw image data. In some embodiments, the system 700 may further include a training model determiner device 736 configured to generate and/or store a training model of the ROI according to embodiments. In some embodiments, the system 700 may further include an image generator 746 configured to generate a segmented image according to embodiments. In some embodiments, the image generator 746 may include an eigen-image generation module configured to generate at least one eigenimage according to embodiments; a reference eigenimage generation module configured to generate at least one reference eigenimage according to embodiments; an image registration module configured to register the at least one reference eigenimage to the training module according to embodiments; an image segmentation module configured to segment each image according to embodiments; among others; or a combination thereof In some embodiments, the identification information input device 730 may include a communication interface 748 configured to conduct receiving and transmitting of data between other modules on the system and/or network. The communication interface 748 may be a wired and/or wireless interface, a switched circuit wireless interface, a network of data processing devices, such as LAN, WAN, the interne, or combination thereof. The communication interface may be configured to execute various communication protocols, such as Bluetooth, wireless, and Ethernet, in order to establish and maintain communication with at least another module on the medical facility network.

In some embodiments, the system 700 may include an input/output 738 configured for receiving information from one or more input devices 750 (e.g., a keyboard, a mouse, and the like) and/or conveying information to one or more output devices 760 (e.g., a printer, a CD writer, a DVD writer, portable flash memory, etc.).

In some embodiments, the system 700 may include one or more input devices 750 configured to control the generation of the medical images, display of medical images on a display 770, and/or printing of the images by a printer interface. The input devices 750 may include a mouse, joystick, keyboard, track ball, touch activated screen, light wand, voice control, or any similar or equivalent input device, and may be used for interactive geometry prescription.

In some embodiments, the system 700 may include graphics controller 742 configured to process data for presentation on a monitor, such as display 770, in a human readable format.

In some embodiments, the system 700 may include or communicate with an interventional device or system 780, for example, configured for cardiac interventional procedures.

It is to be understood that the embodiments of the disclosure may be implemented in various forms of hardware, software, firmware, special purpose processes, or a combination thereof. In one embodiment, the disclosure may be implemented in software as an application program tangible embodied on a computer readable program storage device. The application program may be uploaded to, and executed by, a machine comprising any suitable architecture. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

It is to be further understood that, because some of the constituent system components and method steps depicted in the accompanying figures may be implemented in software, the actual connections between the systems components (or the process steps) may differ depending upon the manner in which the disclosure is programmed. Given the teachings of the disclosure provided herein, one of ordinary skill in the related art will be able to contemplate these and similar implementations or configurations of the disclosure.

While the disclosure has been described in detail with reference to exemplary embodiments, those skilled in the art will appreciate that various modifications and substitutions may be made thereto without departing from the spirit and scope of the disclosure as series forth in the appended claims. For example, elements and/or features of different exemplary embodiments may be combined with each other and/or substituted for each other within the scope of this disclosure and appended claims.

What is claimed is:

1. A method for segmenting an image series of at least one image of a region of interest of a subject, comprising:
   generating a plurality of eigenimages for the image series, the generating including extracting at least one motion region of the region of interest as the plurality of eigenimages;
   registering at least one reference eigenimage to a training model of the region of interest, the at least one reference eigenimage being based on at least one eigenimage of the plurality of eigenimages and the training model including at least one segmented image of the region of interest;
   segmenting each image, the segmenting including applying a localized region based level set function; and
   outputting each segmented image.

2. The method according to claim 1, wherein the image series includes a plurality of images of the region of interest, and the method further comprises:
   generating at least one reference eigenimage for the image series, the generating the reference eigenimage including selecting at least a portion of the plurality of eigenimages for the image series based on eigenvalue.

3. The method according to claim 1, wherein the generating the plurality of eigenimages includes using sparse matrix transform to extract the at least one motion region.

4. The method according to claim 1, wherein the segmenting includes:
   determining at least one initialization region, the determining including estimating at least one initialization region for the training model.

5. The method according to claim 4, wherein the at least one initialization region includes an interior region and an exterior region relative to the region of interest.

6. The method according to claim 4, wherein the at least one initialization region includes an epicardial region and an endocardiac region.

7. The method according to claim 4, wherein the segmenting includes:
   adjusting the at least one initialization region until the segmented image has a minimum energy.

8. The method according to claim 7, wherein the adjusting the at least one initialization region includes varying the training model.

9. The method according to claim 1, wherein the segmenting includes segmenting an epicardial boundary and an endocardial boundary of a right ventricle for each image.

10. A non-transitory computer-readable storage medium storing instructions for segmenting an image series of at least one image of a region of interest of a subject, the instructions comprising:
    generating a plurality of eigenimages for the image series, the generating including extracting at least one motion region of the region of interest as the plurality of eigenimages;
    registering at least one reference eigenimage to a training model of the region of interest, the at least one reference eigenimage being based on at least one eigenimage of the plurality of eigenimages and the training model including at least one segmented image of the region of interest;

segmenting each image, the segmenting including applying a localized region based level set function; and outputting each segmented image.

11. The medium according to claim 1, wherein the image series includes a plurality of images of the region of interest, and the instructions further comprise:

generating the at least one reference eigenimage for the image series, the generating the at least one reference eigenimage including selecting at least a portion of the plurality eigenimages based on eigenvalue.

12. The medium according to claim 1, wherein the generating the plurality of eigenimages includes using sparse matrix transform to extract the at least one motion region.

13. The medium according to claim 1, wherein the segmenting includes:

determining at least one initialization region, the determining including estimating at least one initialization region for the training model.

14. The medium according to claim 13, wherein the at least one initialization region includes an interior region and an exterior region relative to the region of interest.

15. The medium according to claim 13, wherein the at least one initialization region includes an epicardial region and an endocardiac region.

16. The medium according to claim 13, wherein the segmenting includes:

adjusting the at least one initialization region until the segmented image has a minimum energy.

17. The medium according to claim 13, wherein the adjusting the at least one initialization region includes varying the training model.

18. The medium according to claim 13, wherein the segmenting includes segmenting an epicardial boundary and an endocardial boundary of a right ventricle for each image.

19. A system for segmenting an image series of at least one image of a region of interest of a subject, comprising:

an eigenimage generation module configured to generate a plurality of eigenimages for the image series, the eigenimage generation module being configured to extract at least one motion region of the region of interest as the plurality of eigenimages;

an image registration module configured to register at least one reference eigenimage to a training model of the region of interest, the at least one reference eigenimage being based on at least one eigenimage of the plurality of eigenimages and the training model including at least one segmented image of the region of interest; and an image segmentation module configured to segment each image by applying a localized region based level set function.

20. The system according to claim 19, wherein the image series includes a plurality of images of the region of interest, and the system further comprises:

a reference eigenimage generation module configured to generate the at least one reference eigenimage for each image based on at least a portion of the plurality of eigenimages for the series having a range of eigenvalues and/or eigenvalue.

* * * * *